FIG. 1

INVENTORS
ARNOLD UNGER
ARTHUR C. DIANI
PAUL ARNOLD
BY 
ATTORNEY

FIG. 4

INVENTORS
ARNOLD UNGER
ARTHUR C. DIANI
PAUL ARNOLD
BY
ATTORNEY

United States Patent Office 3,103,329
Patented Sept. 10, 1963

3,103,329
CONTROL SYSTEM FOR CLOSED LOOP FLIGHT
Arnold Unger, Totowa, Arthur C. Diani, Clifton, and Paul W. Arnold, River Edge, N.J., assignors to The Bendix Corporation, a corporation of Delaware
Filed Apr. 7, 1960, Ser. No. 20,768
27 Claims. (Cl. 244—77)

The present invention relates to systems for controlling the flight of a craft, and, more particularly, to such systems for directing a craft to fly a predetermined closed loop course such as a holding pattern.

Prior to the present invention, a pilot flying a ground track determined by radio, Doppler, radar or dead reckoning toward an airport and having received a directive from the control tower to fly a holding pattern while waiting to land would, upon reception of a position fixing radio signal, control the craft manually either through the control linkage or through the automatic pilot to execute the required closed loop flight.

This closed loop may be one of many patterns which maintains the craft within a desired holding area and the chosen pattern is repeated until clearance is given for the craft to land.

To maintain this pattern, the pilot must constantly monitor heading, cross-wind, elapsed time, and cross pointer indication. Concurrently he must mentally compute changes in cross-wind and heading before initiating the flight mode (constant rate turn, beam capture, beam track, outbound or inbound heading, etc.) for the subsequent control interval of the craft's flight path. After initiating the appropriate mode, the pilot actively particiaptes in controlling the craft according to that mode.

Since maintaining a holding pattern inherently involves a continuous and recurrent change in flight mode, the pilot is continuously active monitoring, computing, and correcting at the same time he is operating the craft's controls.

This procedure is fatiguing to the pilot and does not permit him to fulfill his important duty of monitoring the general state of the craft as indicated by the cockpit instrument display.

Accordingly, it is an object of the present invention to provide a novel system for automatically controlling the flight of a craft along a closed loop course.

Another object is to provide such a system for accurately controlling the flight of a craft along a predetermined closed loop ground track.

Another object is to incorporate such a system into a conventional automatic flight control system.

Another object is to provide such a system which automatically detects and responds to a radio fix signal to initiate the closed loop flight.

Another object is to provide such a system in which the heading of the craft determines the point of termination of an arcuate portion of the closed loop course.

Another object is to provide such a system which automatically compensates for the effects of cross-winds.

Another object is to provide such a system in which the craft is controlled along one portion of the closed loop course to maintain a predetermined level in one of the flight control system command signals.

A further object is to incorporate such a system into a conventional automatic flight control system at a minimum additional cost and with the addition of a minimum number of components.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for the purpose of illustration and description only, and are not intended as a definition of the limits of the invention.

Figure 1:
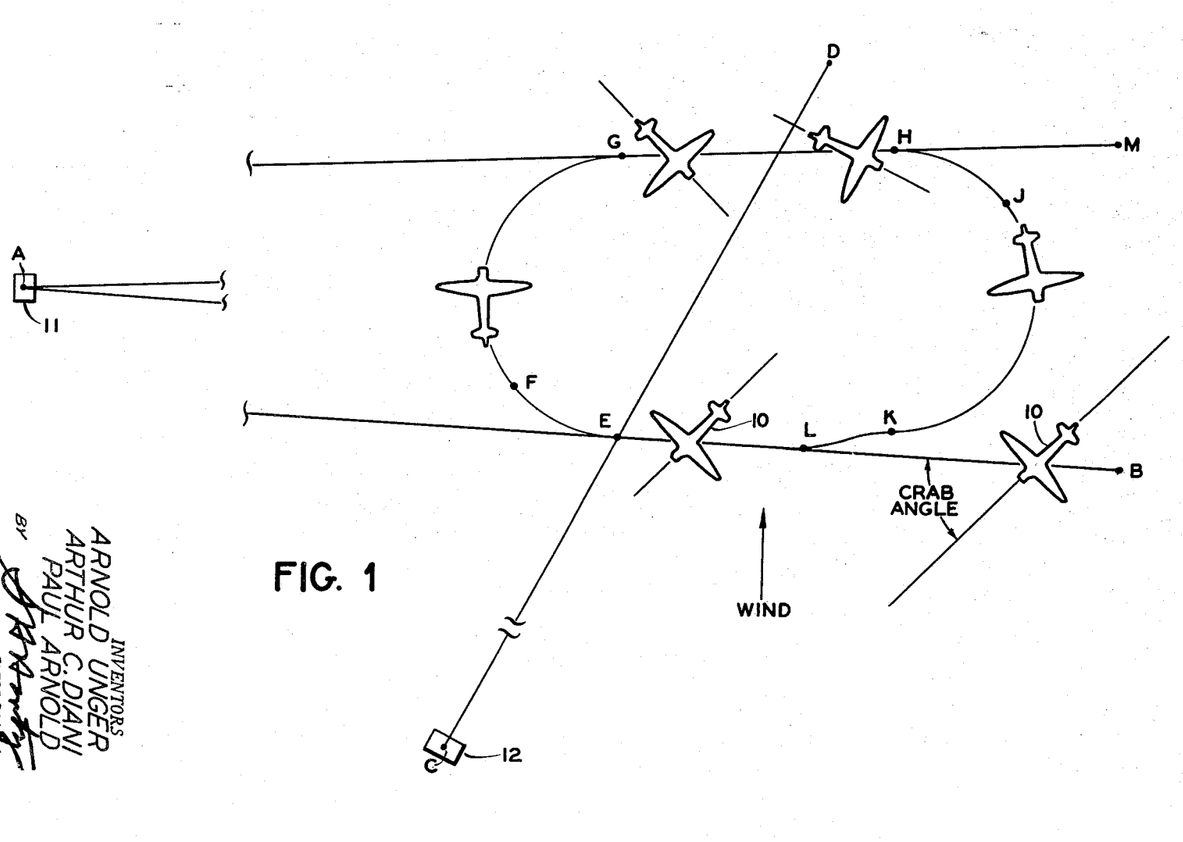
FIGURE 1 illustrates the ground track of one form of a holding pattern loop.

Referring to the drawings in detail, FIGURE 1 illustrates the flight path of a craft 10 as it approaches a radio transmitter 11 along a radio beam defining a bearing AB and executes a holding pattern loop under the control of the system of the present invention.

A second radio transmitter 12 provides a radio beam defining a line CD which intersects the bearing AB at the starting point E of the holding pattern loop. The holding pattern loop is defined by the ground track EFGHJKL and includes a constant rate turn flight path EFG, an outbound or backleg flight path GH along a radio beam from transmitter 11 defining a bearing AM, a second constant rate turn flight path HJK, a beam capture flight path KL, and an inbound flight path LE along the radio bearing AB.

The transmitters 11 and 12 can be of any navigational type, which produces radiation along one or more bearings that can be distinguished from other portions of their radiation patterns by a compatible receiver.

Figure 2:
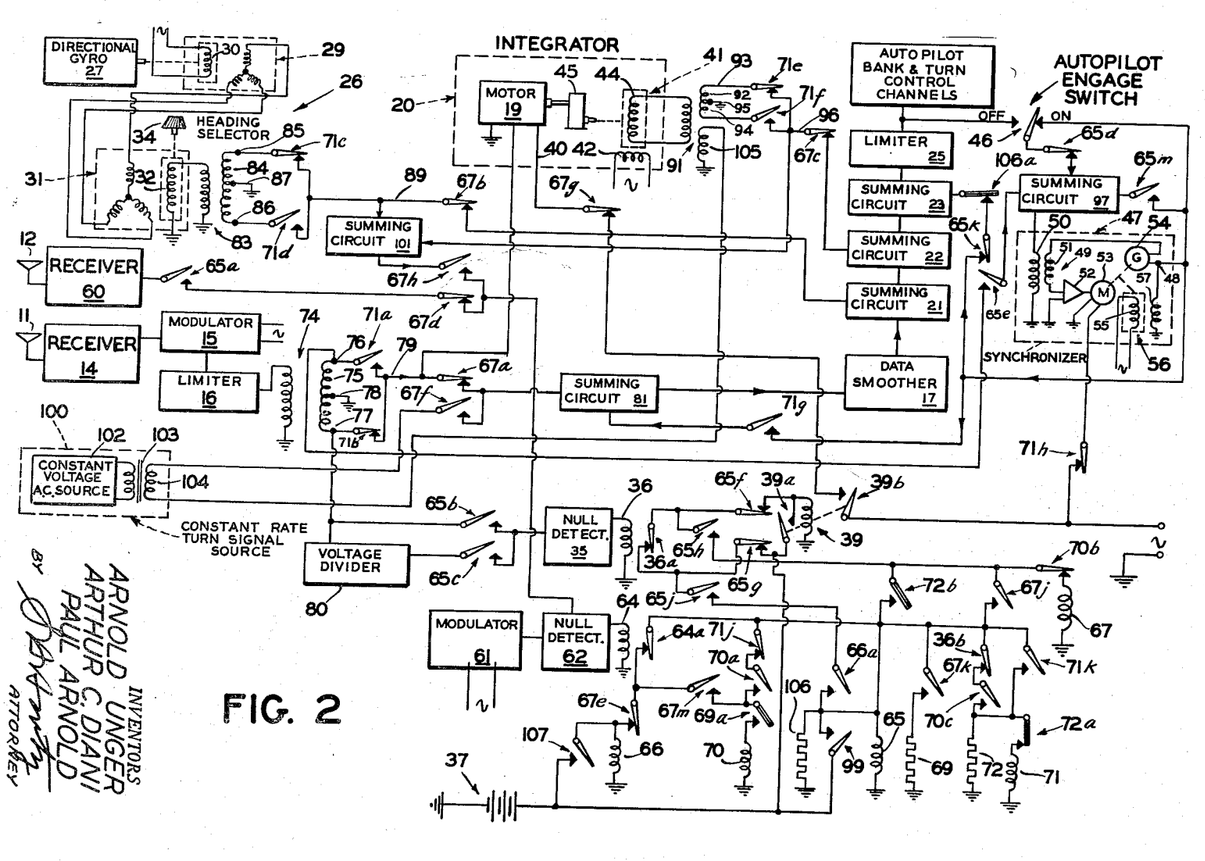
FIGURE 2 is a schematic diagram of a novel flight control system constructed according to the present invention for directing a craft along the closed loop course shown in FIGURE 1.

In FIGURE 2 there is shown novel apparatus constructed according to the present invention for controlling the craft 10 in the execution of the holding pattern loop shown in FIGURE 1.

A navigational receiver 14 of a type compatible with the transmitter 11 produces a direct current output defining the position of the craft with respect to the radio bearing AB. This output has a magnitude proportional to the displacement of the craft from the bearing and a polarity defining the direction of the displacement from the bearing (right or left). When the path of the craft 10 is in exact alignment with the bearing AB, the output of the receiver 14 is zero defining an on-course condition.

The output of the receiver 14 is converted by a modulator 15 to an alternating current signal having an amplitude proportional to the magnitude of the receiver output and a phase dependent upon the polarity of the receiver output. This alternating current signal is amplitude limited by a limiter 16 and then is applied to a data smoother 17 and to the variable phase winding of a motor 19 in an electro-mechanical integrator 20. The data smoother 17 is essentially a low pass filter and removes high frequency components in the limiter output resulting from the motion of the craft through any irregularities which may exist in the propagation pattern of the transmitter 11.

The output of the data smoother is fed through summing circuits 21, 22 and 23 wherein it is combined with other signals to produce a resultant signal which is passed through a bank limiter 25 to the rudder and aileron control channels. The bank limiter 25 acts to limit the magnitude of the signal applied to the automatic pilot control channels to limit the rate of turn of the craft to some preselected maximum.

When the craft is displaced from the center of the beam defining the bearing AB, the receiver produces a direct current output which is converted by the modulator 15 into an alternating current signal of the proper phase and magnitude to steer the craft back to the beam center so that the receiver output is zero. The width of the beam defining the bearing AB increases as the distance from the transmitter increases, consequently the lateral displacement from beam center required to produce a given receiver output also increases with distance from the transmitter.

Heading error apparatus 26 includes a directional gyro 27, a synchro transmitter 29 having a rotor coil 30 positioned by the gyro, and a synchro receiver 31 having a rotor coil 32 positioned in accordance with the desired heading AB by a heading selector knob 34. When the craft deviates from the heading of the bearing AB, a signal is produced across the receiver rotor 32 which has a magnitude proportional to the angular displacement of the craft from the desired heading and a phase dependent upon the direction of the displacement.

The apparatus 26 produces a heading error signal which is 180 degrees out of phase with the track error signal produced by the modulator 15. These signals are, therefore, subtracted in the summing circuit 21. Also connected to the output of the limiter 16 is a null detector 35 which amplifies and rectifies the output of the limiter and energizes a relay 36 to maintain relay contacts 36a open when the output of the limiter is above a predetermined level.

When the craft 10 is initially positioned on the radio bearing AB, the output of the receiver 14 decreases to a value at which the null detector 35 deenergizes the coil 36 closing the relay contacts 36a. A current path is then established from a direct current source 37 through a tracking lock relay 39 which closes contact pairs 39a and 39b to respectively lock relay 39 in the energized condition and connect fixed phase alternating current to the fixed phase winding of the integrator motor 19 through a conductor 40. The integrator also includes a synchro 41 having a stator winding 42 excited by fixed phase alternating current and a rotor winding 44 positioned by the output shaft of a gear train 45 driven by the motor 19. The rotor winding 44 is initially positioned at right angles to the stator winding 42 and, therefore, no output is developed across the rotor winding 44.

When the craft 10 is proceeding along the ground track defined by the radio bearing AB with a compass heading corresponding to that of the bearing AB, and the surfaces trimmed, the track error signal and the heading error signal are both zero and the rudder and aileron control surfaces are centered. With the control surfaces centered, the craft will fly the desired ground track while maintaining the selected heading in the absence of cross-wind. A cross-wind will, however, cause the craft to drift off the center of the radio beam defining the ground track AB, and, in order to maintain the craft on the track AB, it is necessary to turn the craft into the wind through an angle commonly known as a crab angle. When the craft is displaced from the track AB by a cross-wind, a track error signal appears which is applied to the controls to turn the craft into the wind and back toward the beam center. As the craft turns, however, the directional gyro 27 rotates the coil 29 producing a heading error signal which tends to oppose the track error signal. The integrator 20 operates in the manner described below to cancel the heading error signal and allow the craft to assume a heading into the wind which will maintain the craft on the ground track AB.

The track error signal causes the integrator motor 19 to run at a speed dependent upon the magnitude of the signal to reposition the rotor winding 44 of synchro 41. As the rotor winding 44 rotates from its null position, an increasing alternating current potential is produced therein which is applied to summing circuit 22. The integrator output is opposite in phase to the heading error signal, therefore, as the craft turns in response to a track error signal (produced when the craft is blown off the ground track AB) the heading error signal produced is opposed by the integrator output allowing the craft to turn into the wind under the influence of the track error signal.

The integrator motor 19 runs until the craft returns to the ground track AB when the track error signal is zero.

When the craft is repositioned on the ground track with a heading which cancels the effect of the cross-wind, the rotor winding 44 is positioned so that the integrator output cancels the heading error signal. The resultant signal fed into the rudder and aileron channel is then zero and the control surfaces are centered as the craft proceeds along the ground track AB.

When the automatic pilot is disengaged and the craft is under manual control prior to being positioned on the track AB, the output of the limiter 25 is connected by means of an automatic pilot engage switch 46 (then in the "off" position) to the input of a synchronizer 47 having an output terminal 48.

The synchronizer operates to produce an output signal which is equal in magnitude and opposite in phase to its input signal. This output signal is applied to the summing circuit 23 to balance the output of the limiter 16 so that upon reengagement of the automatic pilot lurching of the craft is prevented due to automatic pilot commands. Upon reengagement of the automatic pilot, the switch 46 is placed in the "on" position connecting the input of the synchronizer 47 to the output terminal 48 to cause the synchronizer output to be driven to zero, slowly placing the control surfaces under the control of the track error signal.

The synchronizer comprises an input transformer 49 having a primary winding 50 and a second winding 51 connected at one end to the input of a servo amplifier 52. The output of the amplifier 52 energizes the variable phase of a servomotor 53 which drives a rate generator 54 and positions a rotor coil 55 of a synchro 56 having a stator coil 57. The stator coil 57 is connected to the output terminal 48 and is connected in series with the output of the rate generator 54 to the other end of the secondary winding 51 of the transformer 49. The fixed phase winding of the motor 53 and the rotor coil 55 are energized by fixed phase alternating current.

In response to a signal at primary winding 50 of transformer 49, the motor 53 is activated and rotates the rotor coil 55 to produce an output in the stator 57. The motor 53 also drives the rate generator 54 which produces an output proportional to the speed of the motor 53. The output of the rate generator 54 is added to the output of the stator 57 and the sum of these outputs is applied to the secondary winding 51 of the transformer 49 to temporarily reduce the signal applied to the servo amplifier 52 to prevent the motor 53 from over driving the rotor coil 55.

All of the apparatus described hereinabove in connection with FIGURE 2 is incorporated in known flight control systems which operate in the above indicated manner to maintain a craft on a ground track defined by a radio bearing.

In the present invention this apparatus is modified as described hereinafter to control the craft in the execution of the holding pattern loop.

A navigational receiver 60 of a type compatible with the transmitter 12 produces a direct current output, similar to that of the receiver 14, which decreases to zero when the craft crosses the radio bearing CD. Alternately, the receiver 60 can be of a type compatible to a distance signal superimposed on the beam of the transmitter 11, in which case the transmitter 12 is omitted and the receiver produces an output which decreases to zero when the craft is a preselected distance from the transmitter 11. The output of the receiver 60 is connected to a modulator 61 which converts the output of the receiver into an alternating current signal which is monitored by a null detector 62. The null detector 62 operates in the same manner as the null detector 35 to deenergize a relay 64 and close contacts 64a when the output of the modulator is decreased to zero and the craft is positioned at the point E.

The null detector 62 cooperates with the null detector 35 and a holding pattern engage relay 65 to control the craft in the execution of the holding pattern by selectively energizing a fix relay 66, a turn relay 67, a turn time delay relay 69, a backleg engage relay 70, a backleg holding relay 71, and a backleg time delay relay 72.

The navigation receiver 60 is connected to the modulator 61 through normally open contacts 65a of the holding pattern engage relay 65 and through normally closed contacts 67d of the turn relay 67.

The track error signal output of the limiter 16 is connected to the integrator 20 and the data smoother 17 by means of a transformer 74 having a secondary winding 75 provided with output terminals 76 and 77 at the ends thereof and a grounded center tap 78 to provide two outputs of opposite phase. The output terminals 76 and 77 are respectively connected through normally open contacts 71a and normally closed contacts 71b (of the backleg holding relay 71) to a conductor 79. The conductor 79 is connected directly to the armature of the integrator motor 19, and is connected through normally closed turn relay contacts 67a and a summing circuit 81 to the data smoother 17. The output terminal 77 is also connected to the null detector 35 both through normally closed relay contacts 65b and through a voltage divider 80 and normally open relay contacts 65c.

In like manner, the heading error signal output of the synchro rotor coil 32 is connected to the summing circuit 21 by means of transformer 83 having a secondary winding 84 provided with output terminals 85 and 86 at the ends thereof and a grounded center tap 87 to provide two outputs of opposite phase.

The terminals 85 and 86 are respectively connected through normally closed relay contacts 71c and normally open relay contacts 71d (of the backleg holding relay 71) to a conductor 89. The conductor 89 is connected through normally closed turn relay contacts 67b to the summing circuit 21.

Also, in like manner, the output of the rotor winding 44 in the integrator 20 is connected to the summing circuit 22 by means of a transformer 91 having a secondary winding 92 provided with output terminals 93 and 94 at the ends thereof and a grounded center tap 95 to produce two outputs of opposite phase. The terminals 93 and 94 are respectively connected through normally closed relay contacts 71e and normally open relay contacts 71f to a conductor 96. The conductor 96 is connected through normally closed turn relay contacts 67c to the summing circuit 22.

The output terminal 48 of the synchronizer 47 is connected to the summing circuit 23 through normally closed relay contacts 65k and is connected to the synchronizer input through normally closed relay contacts 65d and a summing circuit 97. The summing circuit 97 is also connected by means of normally open contacts 65e to the terminal 76 of the transformer 74.

As the craft 10 proceeds from the point B toward the point E under direction from the control tower to fly a holding pattern, the pilot manually closes a holding pattern engage switch 99 to energize the holding pattern engage relay 65 and condition the system for holding pattern operation.

When the relay 65 is energized the contacts thereof operate as follows:

The normally open contacts 65a close to connect the receiver 60 to the modulator 61 thus conditioning the system to respond to the fix signal from the transmitter 12. The contacts 65b open and the contacts 65c close to connect the voltage divider 80 into the input circuit of the null detector 35. The voltage divider 80 permits only a portion of the output of the receiver 14 to be applied to the null detector 35 and therefore increases the receiver output required to cause the null detector 35 to energize the relay 36 and open the contacts 36a. This insures that the contacts 36a are closed when the craft reaches the point E even though an irregularity in the propagation pattern of the transmitter 11 at that point may cause the receiver 14 to produce a substantial output. Normally closed contacts 65f and 65g connected in series with the contacts 36a between the D.C. source 37 and the relay 39 open, and normally open contacts 65h and 65j close to connect the turn relay 67 in series with contacts 36a, normally closed backleg engage relay contacts 70b, and normally open fix relay contacts 66a.

The contacts 65d open and the contacts 65e close to connect the input of the synchronizer 47 to the output terminal 76 of the limiter output transformer 74.

The contacts 65k open to disconnect the synchronizer output terminal 48 from the summing circuit 23, and normally open contacts 65m close to provide feedback from the terminal 48 to the input of the synchronizer.

When the craft crosses the radio bearing CD at the point E, the output of the receiver 60 decreases to zero and the null detector 62 deenergizes the relay 64 to close the contacts 64a and energize the fix relay 66 through normally closed turn relay contacts 67e. When the relay 66 is energized, the contacts 66a close energizing the relay 67.

When the relay 67 is energized, the contacts thereof operate as follows:

The contacts 67a open and contacts 67f close to connect the output of a constant rate turn signal source 100 to the input of the data smoother 17 placing the craft in a constant rate of turn.

Contacts 67g open deenergizing the fixed phase winding of the integrator motor 19 to stop the operation of the integrator and maintain its output constant.

The contacts 67b and 67c open to disconnect the outputs of the heading error source 26 and integrator 20 from the summing circuits 21 and 22, respectively.

The contacts 67d open disconnecting the output of the receiver 60 from the modulator 61, and contacts 67h close connecting the outputs of the heading error source 26 and the integrator 20 through a summing circuit 101 to the input of null detector 62.

The contacts 67j close to lock up the relay 67, the contacts 67e open to deenergize the fix relay 66, and the contacts 67k close to supply current to the turn time delay relay 69. The time delay relay 69 comprises a heater element and a pair of contacts 69a in series with the relay 70 including a contact mounted on a bimetallic strip which bends when heated by the heater to make contact with the other contact of the pair 69a after it has been heated for a predetermined time. The contacts 67m close to condition the backleg engage relay 70 for operation when the null detector 62 responds to a null in the output of the summing circuit 101 after the contacts 69a of the time delay relay 69 close at the point F.

As a result of these relay operations the craft goes into a constant rate turn under the influence of the constant rate turn signal source 100 which comprises a constant voltage alternating current source 102 and an output transformer 103 having a secondary winding 104 one end of which is connected to the contacts 67f and the other end of which is connected to a second output winding 105 of the integrator output transformer 91.

The output of the turn signal source 100 is a constant voltage which is the sum of the voltages present on the transformer windings 104 and 105. This output voltage is applied to the data smoother 17 and displaces the control surfaces a predetermined amount and maintains this displacement to cause the craft to fly an arcuate path between ground points E and G.

If no cross-wind is present the integrator output is zero and the craft flies an arc of a circle to the point G under the influence of the output of the transformer winding 104. When a cross-wind is present, however, an integrator output exists which is added or subtracted from the output of the transformer winding 104 depending upon the phase of the integrator output (which is dependent upon the direction of the cross-wind). If the cross-wind is such that the craft will fly downwind during the turn the integrator output is in phase with the output of the transformer winding 104 and the resultant output of the source 100 will be greater, thus putting the craft into a tighter turn to compensate for the drift of the craft.

If the cross-wind is such that the craft will head into the wind during the turn, the output of the integrator is out of phase with the output of the transformer winding 104 and the resultant output of the source 100 will be decreased. The craft will, therefore, be placed in a slower turn to compensate for the effect of the wind.

The output of the integrator thus modifies the output of the source 100 so that under any wind condition the craft will pass over the ground point G.

At point E, when the heading error signal and the integrator output are connected through the summing circuit 101 to the null detector 62, the heading error signal and the integrator output are equal and of opposite phase. The normally open contacts 69a of the turn time delay relay 69 prevent the backleg engage relay 70 from being energized at this time.

As the craft turns, the output of the heading error signal source changes while the integrator output remains constant. The heading error signal becomes equal in magnitude and opposite in phase to the integrator output when the craft has completed a turn equal to 180 degrees plus twice the crab angle (if the craft is flying downwind during the turn) or minus twice the crab angle (if the craft is flying into the wind during the turn).

Under the conditions shown in FIGURE 1 wherein the craft files downwind during the turn, the heading error signal decreases to zero when the craft turns parallel to the track AB, then increases in magnitude in phase with the integrator output until the craft is perpendicular to the track AB, then decreases in magnitude (phase unchanged) as the craft again turns parallel to the track AB (headed in the opposite direction) and finally increases in magnitude out of phase with the integrator as the craft again turns into the wind. When the craft again assumes the original crab angle the heading error signal is again equal in magnitude and opposite in phase to the integrator output.

As the craft executes this turn, the track error signal is continuously fed to the input of the synchronizer 47, causing the motor 53 to rotate the synchro rotor coil 55. When the output across the synchro stator coil 57 is equal in magnitude and opposite in phase to the input track error signal, the synchronizer output fed through the contacts 65m balances the track error signal and the motor 53 stops. Therefore, throughout the turn, the synchronizer output is at all times equal and opposite to the track error signal and represents the lateral displacement of the craft from the radio bearing AB.

When the craft arrives at the point G, the heading error signal is equal in magnitude and opposite in phase to the integrator output and the null detector 62 deenergizes the relay 64 closing the contacts 64a and energizing the backleg engage relay 70. The contacts 70a of the relay 70 close to temporarily lock up the relay 70 and the contacts 70b open to deenergize the turn relay 67. The contacts 70c of relay 70 also close energizing the backleg hold relay 71, through the normally closed contacts 72a of the backleg time delay relay 72, and producing a current flow in the time delay relay 72.

The relay 72 is constructed in the same manner as relay 69 and the contacts 72a open after a backleg flight of a predetermined duration (e.g. 1 or 2 minutes).

The deenergization of the turn relay 67 returns the contacts thereof to the condition shown in FIGURE 2.

The energization of the backleg holding relay 71 opens the contacts 71j to unlock the relay 70 and closes the contacts 71k to lock up the relay 71. The relay 71 also connects opposite phase track error signals to the summing circuit 81 through contacts 71a and connects the synchronizer output to the summing circuit 81 through contacts 71g. The fixed phase excitation current for the synchronizer motor 53 is interrupted by the operation of the contacts 71h, preventing further operation of the synchronizer 47 to maintain the output thereof equal to the track error signal present at the output of the limiter 16 at the point G. The track error signal delivered to the summing circuit is, therefore, equal in magnitude and opposite in phase to the synchronizer output and these outputs cancel each other so that the data smoother 17 receives no input.

The operation of the relay 71 also reverses the phase of the heading error signal applied to the summing circuit 21 through the operation of contacts 71c and 71d, and reverses the phase of the integrator output signal applied to the summing circuit 22 through the operation of the contacts 71e and 71f.

At the point G the integrator output and the heading error signal are equal in magnitude and opposite in phase and, therefore, cancel each other.

The output to the rudder and aileron control channels at point G is, therefore, zero and the control surfaces are centered.

The system now operates to maintain the aircraft on a course wherein the track error signal output of the limiter 16 remains constant. The lateral displacement from the track AB required to produce a given track error signal increases with distance from the transmitter, and the radio bearing AM defines a course wherein the receiver 14 will produce a constant track error signal equal to that of point G. Any deviation of the craft from the course results in an output from the summing circuit 81 which repositions the craft on the course. Any change in the cross-wind causes the integrator to operate to reposition the craft at a new crab angle.

At the end of the predetermined time delay of the relay 72, the contacts 72a open deenergizing the relay 71 and the contacts 72b close energizing the turn relay 67 to initiate a second constant rate turn. The craft is then at the point H and the output of the constant rate turn signal source 100 is connected to the data smoother 17 while the summation of the heading error signal and the integrator output are monitored by the null detector 62, in the manner described in connection with the first constant rate turn. At the point J the contacts 69a of the time delay relay 69 close to condition the relay 70 for energization when the relay contacts 64a close in response to the detection of a null by the null detector 62. As the craft approaches the point K, the track error signal output of the limiter 16 decreases to a value which causes the null detector 35 to deenergize the relay 36 opening the contacts 36b connected in series with the contacts 70c of the backleg engage relay 70. When the craft reaches point K the craft has turned through 180 degrees minus twice the crab angle and the heading error signal is equal in magnitude and opposite in phase to the integrator output. The null detector 62 then deenergizes the relay 64 closing the contacts 64a to energize the relay 70. The relay contacts 70b then open to deenergize the turn relay 67. The contacts 70c also close, however, the open contacts 36b prevent the backleg holding relay 71 from being energized.

Upon deenergization of the turn relay 67, the craft is placed under the influence of the track error signal from the limiter 16 and is repositioned on the ground track AB at the point L. If the holding pattern switch 99 remains closed, the craft will execute another holding pattern loop in response to the reception of a "fix" signal at the point E. If the switch 99 is opened while the craft is on the radio bearing AB, the craft will proceed along the radio bearing past the point E toward the transmitter 11.

Upon opening the switch 99 to release the craft from the holding pattern mode of operation, the relay contacts 65k, which are connected to the synchronizer output terminal, close. When the craft is in the holding pattern mode and is displaced from the bearing AB, the synchronizer output is substantial and a holding pattern disengage time delay relay 106 is provided to delay the connection of the synchronizer output terminal 48 to the summing circuit 23 for a sufficient time after the switch 99 is opened to allow the synchronizer to drive its output to zero.

The time delay relay 106 includes a heater element energized when switch 99 is closed and normally closed contacts 106a serially connected between the synchronizer output 48 and the summing circuit 23. One of the contacts 106a is mounted on a bimetallic strip which bends to break contact upon being heated and cools slowly to reestablish contact at a time subsequent to the interruption of the current flow through the heating element in response to the opening of the switch 99.

A manually operated switch 107 is serially connected between the D.C. source 37 and the fix relay 66 to enable the pilot to manually place the aircraft in the first constant rate turn at the point E if a radio fix signal is not provided at a particular airport.

In those locations where it is necessary that the holding pattern ground track be positioned relatively close to the transmitter 11, the first constant rate turn (EFG) positions the craft on a bearing AM which has a large angular displacement with respect to the bearing AB. Under such conditions, at the completion of the second constant rate turn (HJK) the craft is positioned at a considerable distance from the bearing AB increasing the duration of the beam capture flight path KL.

Figure 3:
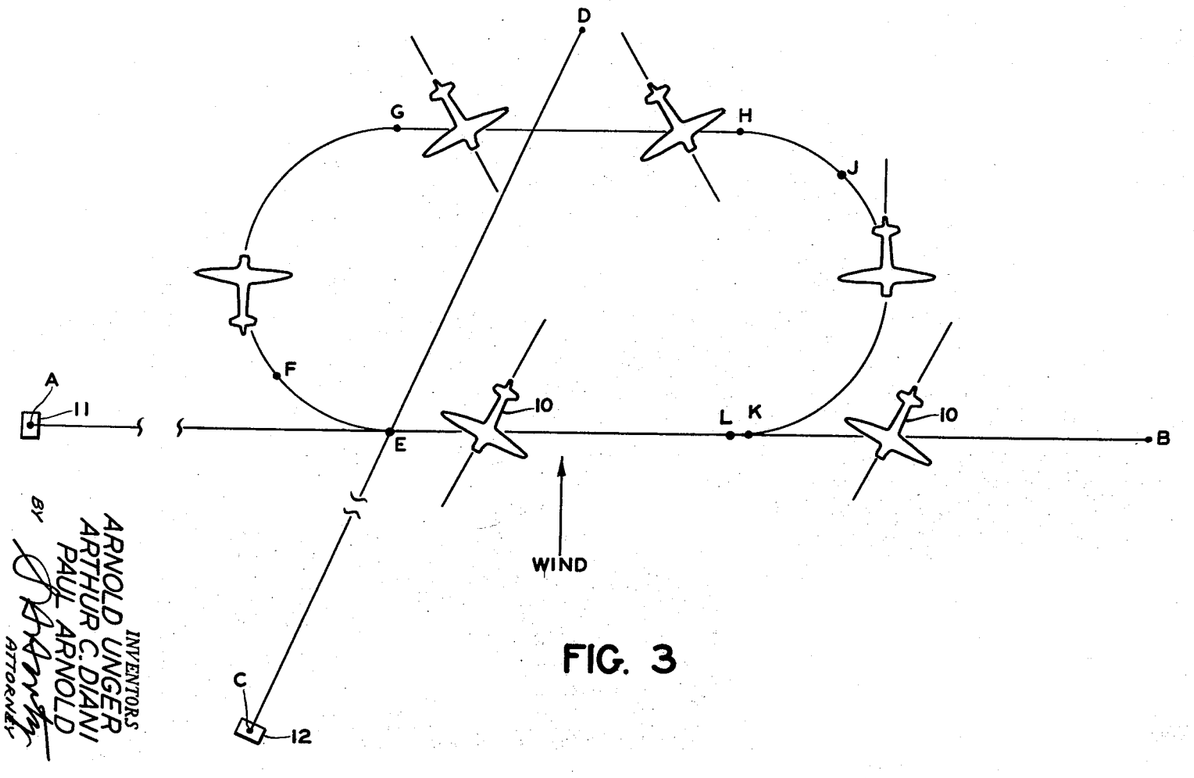
FIGURE 3 illustrates the ground track of another form of holding pattern loop.

It has been found that a more consistently uniform holding pattern ground track is achieved if the outbound flight path GH is made parallel to the bearing AB as shown in FIGURE 3. With such a holding pattern, the distance from the transmitter 11 has no effect, and the second constant rate turn HJK will always bring the craft back onto the bearing AB unless, as described hereinafter, there is a change in the cross-wind.

Figure 4:
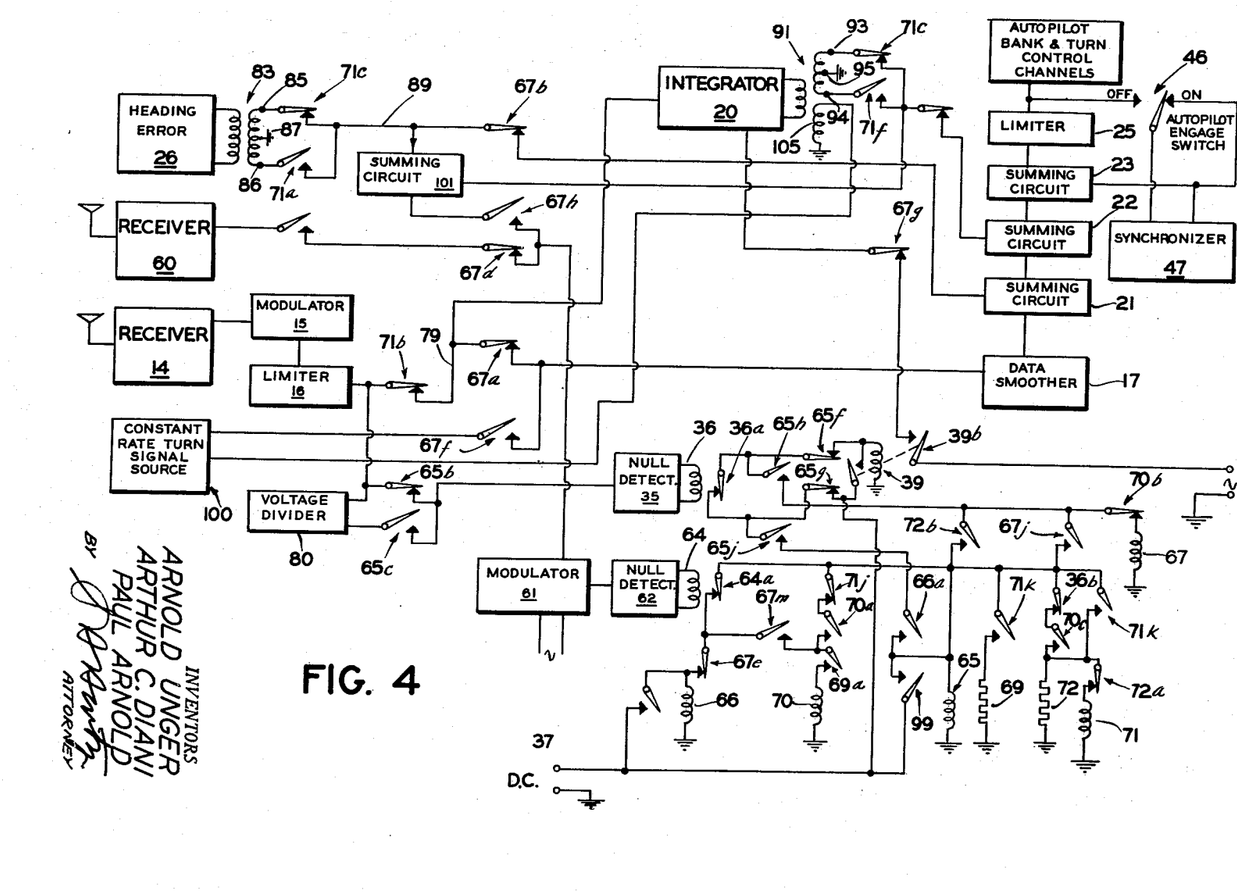
FIGURE 4 is a schematic diagram of a modified form of the invention for directing a craft along the closed loop course shown in FIGURE 3.

In FIGURE 4 there is shown a modification of the apparatus of FIGURE 2 wherein the craft is guided along the outbound flight path GH under the control of the outputs of the heading error signal source 26 and the integrator 20 to execute the holding pattern shown in FIGURE 3.

In the apparatus of FIGURE 4, the synchronizer 47 is not utilized during the holding pattern mode of operation and, therefore, the relay contacts 65d, 65e, 65k, 65m, 71g, and 71h are omitted, together with the connections associated with the contacts 65e, 65m and 71g. In addition, the limiter 16 is provided with a single phase output connected through the contacts 71b to the conductor 79, and the contacts 71a are omitted. The relay 106 is also omitted.

The operation of the system of FIGURE 4 differs from that of the system of FIGURE 2 in that the limiter output is completely disconnected from the data smoother input and from the integrator input by the operation of the contacts 71b when the backleg holding relay 71 operates at the point G. During the backleg flight path, therefore, the integrator output is constant, and is combined only with the heading error signal to produce the resultant output supplying the automatic pilot bank and turn control channels. The heading error signal applied to the summing circuit upon the actuation of the relay 71 defines the deviation of the craft from the reverse compass heading of the ground track AB, and the constant integrator output applied to the summing circuit 22 during the backleg flight path is equal in magnitude and opposite in phase to this heading error signal. The system, therefore, operates to maintain the heading of the craft constant from the point G to the point H. If the cross-wind remains constant during the execution of the holding pattern, the flight path GH will be parallel to the track AB and the completion of the second constant rate turn flight path HJK will position the craft on the track AB at the point L, the points K and L then being in coincidence.

If the cross-wind changes during the execution of the holding pattern, the point K at which the second constant rate turn is completed will be displaced from the track AB and the craft will fly the path KL under the influence of the track error signal as described in connection with the system of FIGURE 2. Under variable cross-wind conditions, the crab angle is re-adjusted each time the craft flies the path LE so that the displacement of the point K from the point L in any holding pattern loop is dependent only upon the change in the cross-wind during that loop.

From the foregoing it will be seen that the present invention provides a novel system for automatically and accurately controlling the flight of a craft along a predetermined closed loop ground track.

Although only two embodiments of the invention have been illustrated and described in detail, it is to be expressly understood that invention is not limited thereto. Various changes can be made in the design and arrangement of the parts without departing from the spirit and scope of the invention as will now be understood by those skilled in the art. For example, instead of using radio equipment for determining the ground track, Doppler, radar or dead reckoning equipment may be used as is well known in the art.

What is claimed is:

1. A control system for automatically directing the course of a craft in a holding pattern maneuver comprising first means for steering the craft along straight line courses, second means for steering the craft along arcuate courses, means for automatically transferring control of the craft from said first means to said second means after a period of straight line travel, and means for automatically transferring the control of the craft from said second means to said first means after a period of arcuate travel to guide the craft in a closed loop course.

2. A control system for automatically directing the course of a craft in a holding pattern maneuver, comprising means for steering the craft along straight line courses, means for steering the craft along arcuate courses, means for automatically transferring control of the craft from said first means to said second means after each period of straight line travel, and means responsive to the degree of turn of the craft for automatically transferring the control of the craft from said second means to said first means after each period of arcuate travel to guide the craft in a closed loop course.

3. A control system for automatically directing the course of a craft in a holding pattern maneuver, comprising means for steering the craft along a first straight line course under one condition and along a second straight line course laterally displaced from said first straight line course under a second condition, means for steering the craft along arcuate courses, means for automatically transferring the control of the craft from said first means to said second means at the end of each of said straight line courses, and means responsive to the degree of turn of the craft for automatically transferring the control of the craft from said second means to said first means at the end of each arcuate course to guide the craft in a closed loop course.

4. A control system for automatically directing the course of a craft in a holding pattern maneuver comprising first means for steering the craft along a predetermined first straight line course under one condition and along a second straight line course laterally displaced from said first straight line course under a second condition, second means for steering the craft along arcuate courses, means for automatically transferring the control of the craft from said first means to said second means at a predetermined point on said first straight line course, means responsive to the degree of turn of the craft for automatically transferring the control of the craft from said second means to said first means after each period of arcuate travel, and means for transferring control of said craft from said first means to said second means after a predetermined duration of travel along said second straight line course to guide the craft in a closed loop course.

5. A control system for automatically directing the course of a craft in a holding pattern maneuver, comprising means for steering the craft along each of two laterally displaced straight line courses each having a predetermined relationship to a radio bearing, means for steering the craft along arcuate courses connecting the ends of said straight line courses, means responsive to a radio signal for automatically transferring control of the craft from said first means to said second means at a predetermined point on one of said straight line courses, means responsive to the degree of turn of said craft for automatically transferring the control of the craft from said second means to said first means, and means for automatically transferring control from said first means to said second means after a predetermined duration of travel along the other of said straight line courses to guide the craft in a closed loop course.

6. A control system having an output adapted to be connected to the controls of a craft for automatically directing the craft in holding pattern maneuver, comprising means producing first and second craft control signals related to a selected path of travel, said first signal being related to the displacement of the craft from said selected path and said second signal being related to the heading deviation of the craft from the bearing of said selected path, means for modifying one of said first and second signals to produce a third craft control signal related to a second selected path of travel, means for producing a fourth craft control signal for placing the craft in a turn, and means for automatically selectively connecting said signals to said output to guide said craft along a closed loop course.

7. Apparatus according to claim 6, including means for modifying said fourth craft control signal in relation to the heading deviation of the craft from the bearing of a selected path of travel to compensate for the effect of cross-wind on the craft during a turn.

8. A control system having an output adapted to be connected to the controls of a craft for automatically directing the craft in a holding pattern maneuver, comprising means producing first and second signals related to a selected path of travel, said first signal corresponding to the displacement of the craft from said selected path and said second signal corresponding to the heading deviation of the craft from the bearing of said selected path, means for modifying one of said first and second signals to produce a third craft control signal related to a second selected path of travel, means for producing a fourth craft control signal for placing the craft in a turn, means responsive to a predetermined change in said second signal during a turn for detecting a predetermined degree of turn, means for determining the completion of a predetermined travel along said second selected path, means responsive to said turn detecting means and said travel determining means for selectively connecting said signals to said output to guide the craft along a closed loop course, and means for initiating the operation of said last mentioned means at a preedetrmined point on said first selected path of travel.

9. Apparatus according to claim 8, wherein said selective connecting means initially connects said first signal to said output and responds to said initiating means to connect said fourth signal to said output to place the craft in a turn.

10. Apparatus according to claim 9, wherein said selective connecting means responds to said travel determining means to connect said fourth signal to said output to place the craft in a second turn.

11. Apparatus according to claim 10, wherein said selective connecting means connects said third signal to said output in response to said turn detecting means to terminate said first turn and connects said first signal to said output in response to said turn detecting means to terminate said second turn.

12. A control system having an output adapted to be connected to the controls of a craft for automatically directing the craft in a holding pattern maneuver, comprising means for producing a first signal corresponding to the displacement of the craft from a selected ground track, means for producing a second signal corresponding to the heading deviation of the craft from a predetermined bearing, means for producing a constant third signal, switching means for initially connecting said first signal to said output to steer the craft along said ground track and for connecting said constant third signal to said output at a predetermined point on said ground track to place the craft in a turn, means for modifying one of said first and second signals to produce a fourth signal corresponding to a path of travel displaced from said ground track, said switching means being responsive to a predetermined change in one of said first and second signals during the turn to connect said fourth signal to said output to steer the craft along said displaced path of travel, timing means for determining the duration of travel along said displaced path, said switching means being responsive to said timing means to connect said constant third signal to said output to place the craft in a second turn and thereafter being responsive to a predetermined change in at least one of said first and second signals during the second turn to reconnect said first signal to said output to steer the craft along said ground track.

13. A control system, having an output adapted to be connected to the controls of a craft for automatically directing a craft in a holding pattern maneuver, comprising means for producing a first signal corresponding to the displacement of the craft from a selected ground track, means for producing a second signal corresponding to the heading deviation of the craft from a predetermined bearing, means for producing a constant third signal balancing the signal produced by said second signal producing means when said craft is on said ground track, means for producing a constant fourth signal for placing the craft in a turn, switching means for initially connecting said first, second and third signals to said output to steer the craft along said ground track, means for detecting a radio signal defining a predetermined point on said ground track, said switching means being responsive to said radio signal detecting means for connecting said constant fourth signal to said output to place the craft in a turn, means for comparing said second and said third signals during a turn, means responsive to said comparing means for detecting a predetermined degree of turn, said switching means being responsive to said turn detecting means for connecting said second and said third signals to said output to steer said craft on a predetermined heading, time delay means for determining the time of travel along said heading, said switching means being responsive to said time delay means to connect said fourth signal to said output to place the craft in a second turn and thereafter being responsive to said turn detecting means to reconnect said first signal to said output.

14. In a craft control system, apparatus for turning a craft to a selected path, comprising means for producing a signal corresponding to the heading deviation of the craft from the bearing of the selected path, means for producing a constant second signal equal to the signal produced by said first means when the craft is proceeding along said selected path, means for comparing said first signal with said constant second signal, and means connected to said comparing means for detecting a predetermined relationship between said first and said constant second signals.

15. In a craft control system, apparatus for steering a craft along a line displaced from a line of reference, comprising means for producing a signal corresponding to the position of the craft with respect to the line of reference, means for producing a constant second signal equal to the signal produced by said first means when the craft deviates from said selected line of reference by a predetermined amount, and means for comparing said first and said constant second signals and producing a craft steering signal equal to the difference therebetween.

16. In a craft control system, apparatus for steering a craft along a line displaced from a line of reference, comprising means for producing a signal related to the displacement of the craft from the line of reference, means for detecting the heading deviation of the craft from a selected bearing, means for producing a constant second signal equal to the signal produced by said first means when said second means detects a predetermined deviation in the heading of the craft from the selected bearing, means for comparing said first and said second signals and producing a craft steering signal equal to the difference therebetween.

17. In a craft control system, apparatus for steering a craft along a line displaced from a line of reference, comprising means for producing a signal related to the heading deviation of the craft from the bearing of the line of reference, means for producing a constant second signal equal to the signal produced by said first means when the craft is traveling along the line of reference, means for comparing said first and second signals and producing an ouput signal equal to the difference therebetween, and means connected to said comparing means for connecting said output signal to control the craft when a predetermined relationship exists between said first and second signals.

18. In a craft control system, apparatus for steering the craft in a turn from a selected path of travel, comprising means for producing a signal related to the heading deviation of the craft from the bearing of the selected path required to maintain the craft on the selected path in the presence of a cross-wind, means for producing a constant signal related to a predetermined rate of turn, and means for modifying said constant signal in accordance with the signal produced by said first means to compensate for the effect of the cross-wind on the craft during the turn.

19. Automatic programming means for maintaining a craft in a predetermined holding pattern on a closed loop course, comprising first means for steering the craft along a radio beam, second means for detecting a predetermined point on the radio beam, third means responsive to said second means for initiating turn of the craft, fourth means for detecting a predetermined extent of turn of the craft, means responsive to said fourth means for steering the craft in a straight line course, and time delay means for initiating a second turn of the craft to return the craft to the radio beam so that the craft flies a closed loop course.

20. In a craft control system, apparatus for initiating a turn at a predetermined point along a selected path of travel, comprising means for producing a signal related to the displacement of the craft from a radio beam at an angle to the path and providing a signal of predetermined amplitude at the predetermined point, means for detecting the predetermined amplitude signal, and means controlled by the last-mentioned means for turning the craft when the signal attains the predetermined amplitude.

21. In a craft control system, apparatus for steering the craft in one direction along a line of reference, through a turn, and in the opposite direction along a line displaced from the line of reference, comprising first means for producing a first signal corresponding to the heading deviation of the craft from the bearing of the line of reference, second means for producing a second signal corresponding to the position of the craft with respect to the line of reference, third means for producing a constant third signal equal to the signal produced by the second means when the craft deviates from the selected line of reference by a predetermined amount, fourth means for producing a constant fourth signal for turning the craft, fifth means for producing a constant fifth signal equal to the signal produced by the first means when the craft is traveling along the line of reference in a crosswind, means for connecting the first, second, and fifth means for controlling the craft while the craft is traveling along the line of reference, means for automatically disconnecting said first and second means from controlling the craft and for connecting said fourth means with said fifth means for turning the craft from the line of reference, means for comparing the first and fifth signals while the craft is turning, and for disconnecting the fourth means from controlling the craft when the first and fifth signals are equal and for connecting the first, second, and third means with the fifth means for controlling the craft in the opposite direction along a line displaced from the line of reference.

22. A craft control system as described in claim 21 including means for reversing the phase of the first, second, and fifth signals for controlling the craft in the opposite direction along the line displaced from the line of reference.

23. In a craft control system, apparatus for steering the craft in one direction along a line of reference, through a turn, and in the opposite direction along a line displaced from the line of reference, comprising first means for producing a first signal corresponding to the heading deviation of the craft from the bearing of the line of reference, second means for producing a second signal corresponding to the position of the craft with respect to the line of reference, third means for producing a constant third signal for turning the craft, and fourth means for producing a constant fourth signal equal to the signal produced by the first means when the craft is traveling along the line of reference in a crosswind, means for connecting the first, second, and fourth means for controlling the craft while the craft is traveling along the line of reference, means for automatically disconnecting said first and second means from controlling the craft and for connecting said third means with said fourth means for turning the craft from the line of reference, means for comparing the first and fourth signals while the craft is turning and for disconnecting the third means from controlling the craft when the first and fourth signals are equal and for connecting the first means with the fourth means for controlling the craft in the opposite direction along a line displaced from the line of reference.

24. In a craft control system, apparatus for steering the craft along a line displaced from a line of reference comprising first means for producing a first signal corresponding to the heading deviation of the craft from the bearing of the line of reference, second means for producing a second signal corresponding to the position of the craft with respect to the line of reference, third means for producing a constant third signal equal to the signal produced by the second means when the craft deviates from the selected line of reference by a predetermined amount, fourth means for producing a constant fourth signal equal to the signal produced by the first means when the craft is traveling along the line of reference in a crosswind, and means for connecting said first, second, third, and fourth means for controlling the craft along the line displaced from the line of reference.

25. In a craft control system, apparatus for steering the craft along a line displaced from a line of reference and in a direction opposite to the direction of travel of the craft along the line of reference, comprising first means for producing a first signal corresponding to the heading deviation of the craft from the bearing of the line of reference, second means for producing a second signal corresponding to the position of the craft with respect to the line of reference, third means for producing a constant third signal equal to the signal produced by the second means when the craft deviates from the selected line of reference by a predetermined amount, fourth means for producing a constant fourth signal equal to the signal produced by the first means when the craft is traveling along the line of reference in a crosswind, and means for connecting said first, second, third, and fourth means for controlling the craft along the line displaced from the line of reference, and for reversing the phase of the first, second, and fourth signals so that the craft travels in a direction opposite to the direction of travel of the craft along the line of reference.

26. In a craft control system, apparatus for steering the craft from a line of reference to a line displaced from the line of reference, comprising first means for producing a first signal corresponding to the heading deviation of the craft from the bearing of the line of reference, second means for producing a constant second signal equal to the signal produced by the first means when the craft is traveling along the line of reference in a crosswind, third means for producing a constant third signal for turning the craft, means for connecting said second and third means for turning the craft from the line of reference, means for comparing the first and second signals while the craft is turning and for disconnecting the third means from controlling the craft when the first and second signals are equal and for connecting the first means with the second means for controlling the craft along the line displaced from the line of reference.

27. A craft control system as described in claim 26 which includes fourth means for producing a fourth signal corresponding to the position of the craft with respect to the line of reference, fifth means connected to the fourth means while the craft is turning and providing a fifth signal equal and opposite to the signal produced by the fourth means when the craft deviates from the selected line of reference, and means for disconnecting the fifth means from the fourth means at the end of the turn, and for connecting the fourth means and fifth means with the first means and the second means for controlling the craft along the line displaced from the line of reference.

References Cited in the file of this patent
UNITED STATES PATENTS

| | | |
|---|---|---|
| 1,794,690 | Horni | Mar. 3, 1931 |
| 2,495,139 | Saint | Jan. 17, 1950 |
| 2,540,150 | Watts | Feb. 6, 1951 |
| 2,662,706 | Gille | Dec. 15, 1953 |
| 2,787,428 | Schuck | Apr. 2, 1957 |
| 2,862,167 | Curry | Nov. 25, 1958 |
| 2,941,753 | Ripper | June 21, 1960 |
| 2,960,283 | Meredith | Nov. 15, 1960 |
| 2,987,276 | Osder | June 6, 1961 |